E. J. SEWARD.
TOY.
APPLICATION FILED NOV. 21, 1908.
935,865.
Patented Oct. 5, 1909.
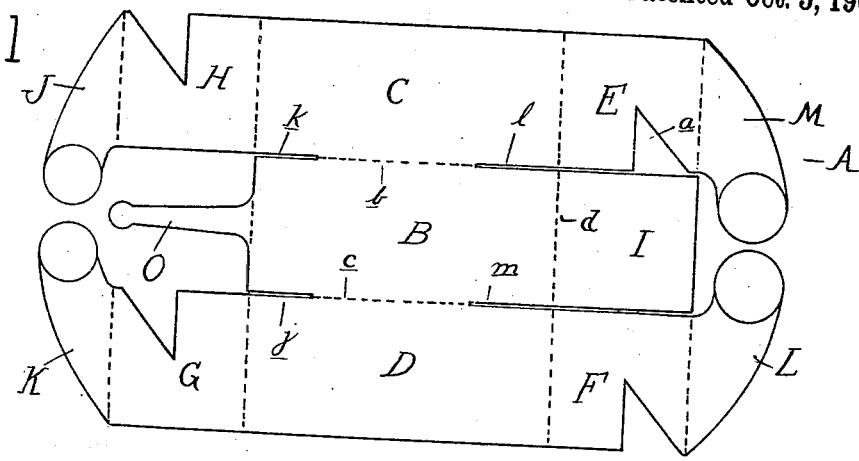
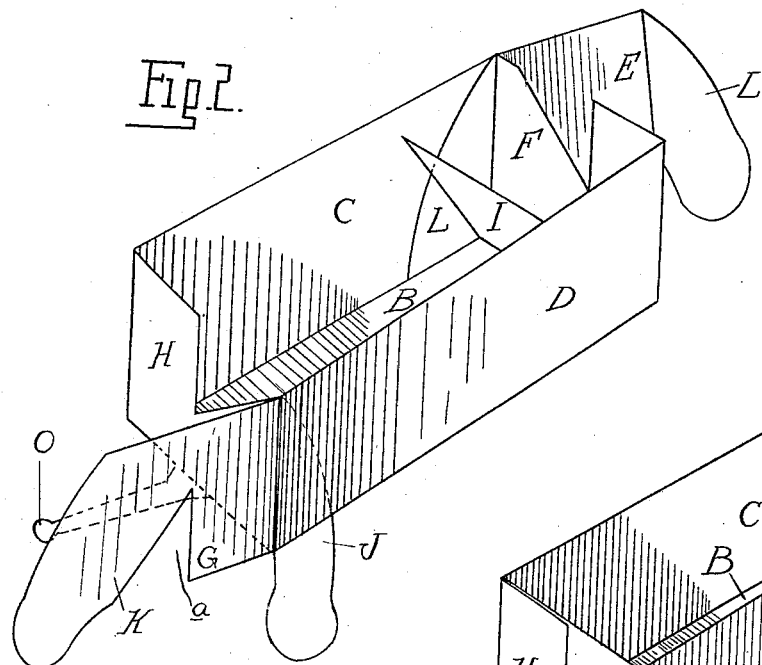
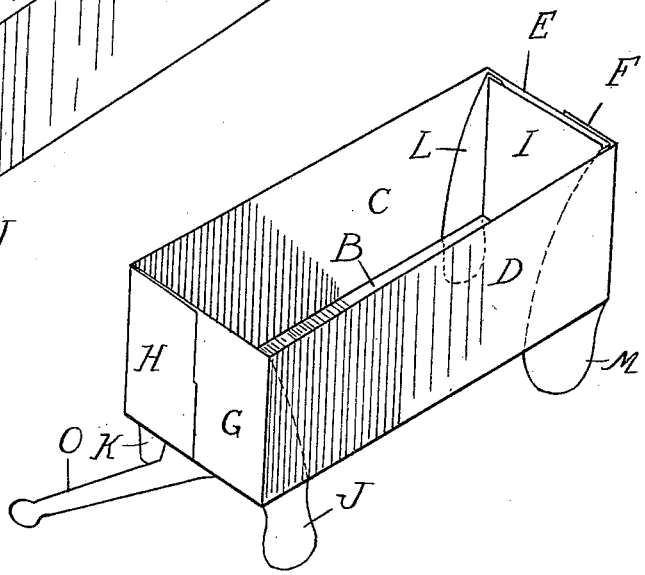
Witnesses
Inventor
Edwin J. Seward
By Whittemore, Hulbert & Whittemore
Att'ys

UNITED STATES PATENT OFFICE.

EDWIN J. SEWARD, OF DETROIT, MICHIGAN, ASSIGNOR TO BERRY BROTHERS, LIMITED, OF DETROIT, MICHIGAN, A COPARTNERSHIP ASSOCIATION.

TOY.

935,865.     Specification of Letters Patent.     Patented Oct. 5, 1909.

Application filed November 21, 1908. Serial No. 463,777.

*To all whom it may concern:*

Be it known that I, EDWIN J. SEWARD, a citizen of the United States of America, residing at Detroit, in the county of Wayne and State of Michigan, have invented certain new and useful Improvements in Toys, of which the following is a specification, reference being had therein to the accompanying drawings.

The invention relates particularly to a toy cart formed preferably (though not necessarily) of cardboard, and especially designed in the present instance as an advertising novelty.

The invention consists in the novel construction of the toy vehicle, in the peculiar arrangement and combination of the parts, and in the construction of the blank from which the vehicle is formed.

In the drawings illustrating the invention,—Figure 1 is a plan view of the blank; Fig. 2 is a perspective view, showing the blank partially folded to form the cart; and Fig. 3 is a similar view, showing the cart complete.

In the drawings thus briefly described, A represents the blank from which the vehicle is formed, struck from a single piece of material. It comprises a central longitudinal section B forming the cart floor or bottom, side sections C and D, sectional end sections E F G H, a reinforcing end section I, and supporting sections J K L M, the latter being preferably cut or stamped to represent wheels of a vehicle. The bottom section B at its several corners is slit longitudinally, as indicated by the reference-letters *m l k j*, and at the end opposite the reinforcing section I is provided with a projection O, constituting the cart tongue; also, the several sectional end members described are each provided with a notch, as *a*, these notches being so formed in the sections that when the blank is folded they will interengage to form a locking connection between the parts.

In the construction of the cart or wagon from the blank, the side sections C and D are bent upwardly in right angular relation to the bottom or floor section B, along the dotted lines *b* and *c*. The reinforcing section I is then folded upwardly along the dotted line *d* and then turned into parallelism with the bottom or floor B. The sectional end members F and H are folded inwardly in right angular relation to their respective sides, and the supporting sections L and J are projected through the slits *l* and *j* in the manner indicated in Fig. 2. The ends E and G are then bent inwardly, and a locking engagement effected between these ends and the complementary end portions F and H through the medium of the notches described, and the supports or wheel sections M and K are projected through the slits *m* and *k*. Finally, the reinforcing section I is turned upwardly into parallelism with the rear end, forming the reinforcement for the rear end of the cart as indicated, the formed cart being illustrated in Fig. 3.

In practice the blank may bear suitable advertising matter that will appear upon the sides and ends of the cart. It will be obvious also that the cart could be as well formed of sheet metal, but it is preferably made of cardboard as best adapted for use as an advertisement.

What I claim as my invention is,—

1. A toy cart, comprising a bottom, sides, sectional ends, and wheel representing sections carried by the end sections projecting in parallelism with the sides below the bottom.

2. A toy cart, comprising a bottom, sides, ends composed each of complementary interlocking sections, and wheel representing sections formed integral with the end sections and projecting downwardly in parallelism with the sides below the bottom.

3. A toy cart, comprising a bottom, sides, and sectional ends, the bottom having its end portions longitudinally slitted at their junction with the sides, and wheel representing sections carried by the end sections extending within the cart body in parallelism with the sides and projecting downwardly through the slits formed in the cart bottom.

4. A toy cart, formed from a single-piece blank, comprising a bottom, sides, sectional ends formed each of complementary members, notched to have an interlocking engagement, and depending sections representing the cart wheels carried by the end sections adapted to be folded within the body and to be projected through slits formed in the cart bottom.

5. A blank for toy carts, struck from a single piece of material comprising a central section adapted to form the cart bottom, side sections adjoining the first-mentioned section, end extensions upon the sides adapted to be folded into right angular relation to the sides and each notched to permit adjoining extensions to interlock one with the other, and inwardly extending portions upon the end extensions adapted to form the wheel supports.

In testimony whereof I affix my signature in presence of two witnesses.

EDWIN J. SEWARD.

Witnesses:
E. M. DILL,
V. C. FULLER,